United States Patent
Ameling et al.

(10) Patent No.: US 10,563,988 B2
(45) Date of Patent: Feb. 18, 2020

(54) SENSOR-LESS INDOOR NAVIGATION ASSISTANCE

(71) Applicant: SAP SE, Walldorf (DE)

(72) Inventors: Michael Ameling, Dresden (DE); Martin Knechtel, Dresden (DE); Philipp Herzig, Potsdam (DE)

(73) Assignee: SAP SE, Walldorf (DE)

( * ) Notice: Subject to any disclaimer, the term of this patent is extended or adjusted under 35 U.S.C. 154(b) by 114 days.

(21) Appl. No.: 14/480,671

(22) Filed: Sep. 9, 2014

(65) Prior Publication Data
US 2015/0160018 A1    Jun. 11, 2015

Related U.S. Application Data

(60) Provisional application No. 61/913,246, filed on Dec. 6, 2013.

(51) Int. Cl.
*G01C 21/20* (2006.01)
(52) U.S. Cl.
CPC ................. *G01C 21/206* (2013.01)
(58) Field of Classification Search
CPC .................................................. G01C 21/206
See application file for complete search history.

(56) References Cited

U.S. PATENT DOCUMENTS

| | | | | |
|---|---|---|---|---|
| 6,256,581 B1* | 7/2001 | Fujii | ................... | G01C 21/3644 701/428 |
| 8,010,285 B1* | 8/2011 | Denise | ............... | G01C 21/3415 340/995.21 |
| 8,320,939 B1* | 11/2012 | Vincent | ................... | G01S 19/48 370/338 |
| 2013/0191246 A1* | 7/2013 | Calman | .............. | G06Q 30/0639 705/26.9 |
| 2013/0321400 A1* | 12/2013 | van Os | ................. | G06T 15/005 345/419 |
| 2014/0142849 A1* | 5/2014 | Ziezold | .............. | G01C 21/3641 701/533 |

OTHER PUBLICATIONS

Wikipedia page Turn-by-Turn, printed Jan. 28, 2016.*
Wikipedia page Directed Graph, printed Feb. 25, 2016.*
Wikipedia page Clock Orientation, printed Jan. 28, 2016.*
Wikipedia page Global Positioning System, printed Jan. 28, 2016.*

(Continued)

*Primary Examiner* — Alan D Hutchinson
(74) *Attorney, Agent, or Firm* — Buckley, Maschoff & Talwalkar LLC

(57) ABSTRACT

Various embodiments of systems and methods for providing navigation assistance are described herein. A navigation assistance request is received for commuting between the start waypoint and the destination waypoint. Based on the received request, the angle-orientation coordinates included in the angle-based navigation instruction are converted to direction-based navigation instructions. Finally, the direction-based navigation instructions are provided to a user. In one embodiment, the direction-based navigation instructions are stored in a directed weighted graph. The directed weighted graph may be used to determine navigation instructions for an intersection point. In one embodiment, crowdsourcing is used to collect the navigation instructions.

20 Claims, 10 Drawing Sheets

(56) References Cited

OTHER PUBLICATIONS

Hardas, M. S., & Purvis, L. (2012). Bayesian vote weighting in crowdSourcing systems. In Computational Collective Intelligence. Technologies and Applications (pp. 194-203). Springer Berlin Heidelberg.*
WikiHow; How to Give Directions, Aug. 31, 2013 (Year: 2013).*
Jing Hang Choo; Soon Nyean Cheong; Yee Lien Lee; Sze Hou Teh, "I 2 Navi: An Indoor Interactive NFC Navigation System for Android Smartphones," in Proceedings of the World Academy of Science, Engineering and Technology, Dec. 2012, pp. 735-739, Issue 72, EbscoHost, Massachusetts, United States. [http://connection.ebscohost.com/c/articles/88941300/i-navi-indoor-interactive-nfc-navigation-system-android-smartphones].
P. Bahl, V. N. Padmanabhan, "RADAR: An In-Building RF-based User Location and Tracking System," in Proceedings of the IEEE International Conference on Computer Communications Nineteenth Annual Joint Conference of the IEEE Computer and Communications Societies, Mar. 26-30, 2000, pp. 775-784, vol. 2, IEEE Xplore Digital Library [http://ieeexplore.ieee.org/document/832252/].
S. Lamy-Perbal, M. Boukallel, N. Castaneda, "An improved pedestrian inertial navigation system for indoor environments," in Proceedings of the IEEE/RSJ International Conference on Intelligent Robots and Systems, Sep. 25-30, 2011, pp. 2505-2510, IEEE Xplore Digital Library [http://ieeexplore.ieee.org/document/6094456/?section=abstract].
G. Trehard, S. Lamy-Perbal, M. Boukallel, "Indoor infrastructure-less solution based on sensor augmented smartphone for pedestrian localisation," in Proceedings of the conference on Ubiquitous Positioning, Indoor Navigation, and Location Based Service, Oct. 3-4, 2012, pp. 1-7, IEEE Xplore Digital Library [http://ieeexplore.ieee.org/document/6409758/].
M. Dissanayake, P. Newman, S. Clark, H. Durrant-Whyte, M. Csorba, "A solution to the simultaneous localization and map building (SLAM) problem," IEEE Transactions on Robotics and Automation, Jun. 2001, pp. 229-241, vol. 17, Issue 3, IEEE Xplore Digital Library [http://ieeexplore.ieee.org/document/938381/].
L. Bruno, P. Robertson, "WiSLAM: Improving FootSLAM with WiFi," in Proceedings of the International Conference on Indoor Positioning and Indoor Navigation, Sep. 21-23, 2011, pp. 1-10, IEEE Xplore Digital Library [http://ieeexplore.ieee.org/document/6071916/].
P. Robertson, M. Angermann, M. Khider, "Improving Simultaneous Localization and Mapping for Pedestrian Navigation and Automatic Mapping of Buildings by using Online Human-Based Feature Labelling," in Proceedings of IEEE/ION Position Location and Navigation Symposium, May 4-6, 2010, pp. 365-374, IEEE Xplore Digital Library [http://ieeexplore.ieee.org/document/5507304/].
Hyojeong Shin, Yohan Chon, Hojung Cha, "Unsupervised Construction of an Indoor Floor Plan Using a Smartphone," IEEE Transactions on Systems, Man, and Cybernetics, Part C (Applications and Reviews), Oct. 25, 2011, vol. 42, Issue 6, pp. 889-898, IEEE Xplore Digital Library, [http://ieeexplore.ieee.org/document/6060924/].
B. Ferris, D. Fox, N. Lawrence, "WiFi-SLAM using Gaussian process latent variable models," in Proceedings of the 20th International Joint Conference on Artifical Intelligence, Jan. 6-12, 2007, pp. 2480-2485, Morgan Kaufmann Publishers Inc. San Francisco, CA, USA.
B. Ozdenizci, K. Ok, V. Coskun, M. N. Aydin, "Development of an Indoor Navigation System Using NFC Technology," in Proceedings of the Fourth International Conference on Information and Computing Science, May 2011, pp. 25-27, NFC Lab Istanbul.
M. M. Haklay, P. Weber, "OpenStreetMap: User-Generated Street Maps," IEEE Pervasive Computing, Oct. 17, 2008, vol. 7, Issue 4, pp. 12-18, IEEE.
M. Goetz, "IndoorOSM—OpenStreetMap Wiki." Nov. 29, 2011, Wiki, Available [Online]—http://wiki.openstreetmap.org/wiki/IndoorOSM.
Google, "Google Map Maker." Available [Online]—https://support.google.com/mapmaker.
T. Springer, T. Hara, G. Bombach, S. Grunau, "An Integrated System for Indoor and Outdoor Location-based Services (MapBiquitous)," in Proceedings of the 11th International Conference on Mobile Systems, Applications and Services, Jun. 26, 2013, pp. 545-546, MobiSys 2013 [https://www.holaportal.com/publication/poster-an-integrated-system-for-indoor-and-outdoor-location-based-services-mapbiquitous-15380/].
Axel Küpper, Location-Based Services: Fundamentals and Operation. Aug. 19, 2005, 386 pages, John Wiley Sons, Ltd [http://as.wiley.com/WileyCDA/WileyTitle/productCd-0470092319.html].
A. Serra, T. Dess'i, D. Carboni, V. Popescu, L. Atzori, "Inertial navigation systems for user-centric indoor applications," in Proceedings of Networked and Electronic Media Summit, Barcelona, 2010.
A. Doan, R. Ramakrishnan, A. Y. Halevy, "Crowdsourcing systems on the World-Wide Web," Communications of the ACM, Apr. 2011, p. 86-96, vol. 54, issue 4, ACM.
A. Serra, D. Carboni, V. Marotto, "Indoor pedestrian navigation system using a modern smartphone," in Proceedings of the 12th ACM international conference on Human computer interaction with mobile devices and services, Sep. 7-10, 2010, pp. 397-398, ACM, Lisboa, Portugal.

* cited by examiner

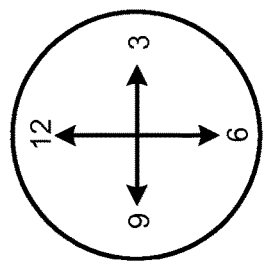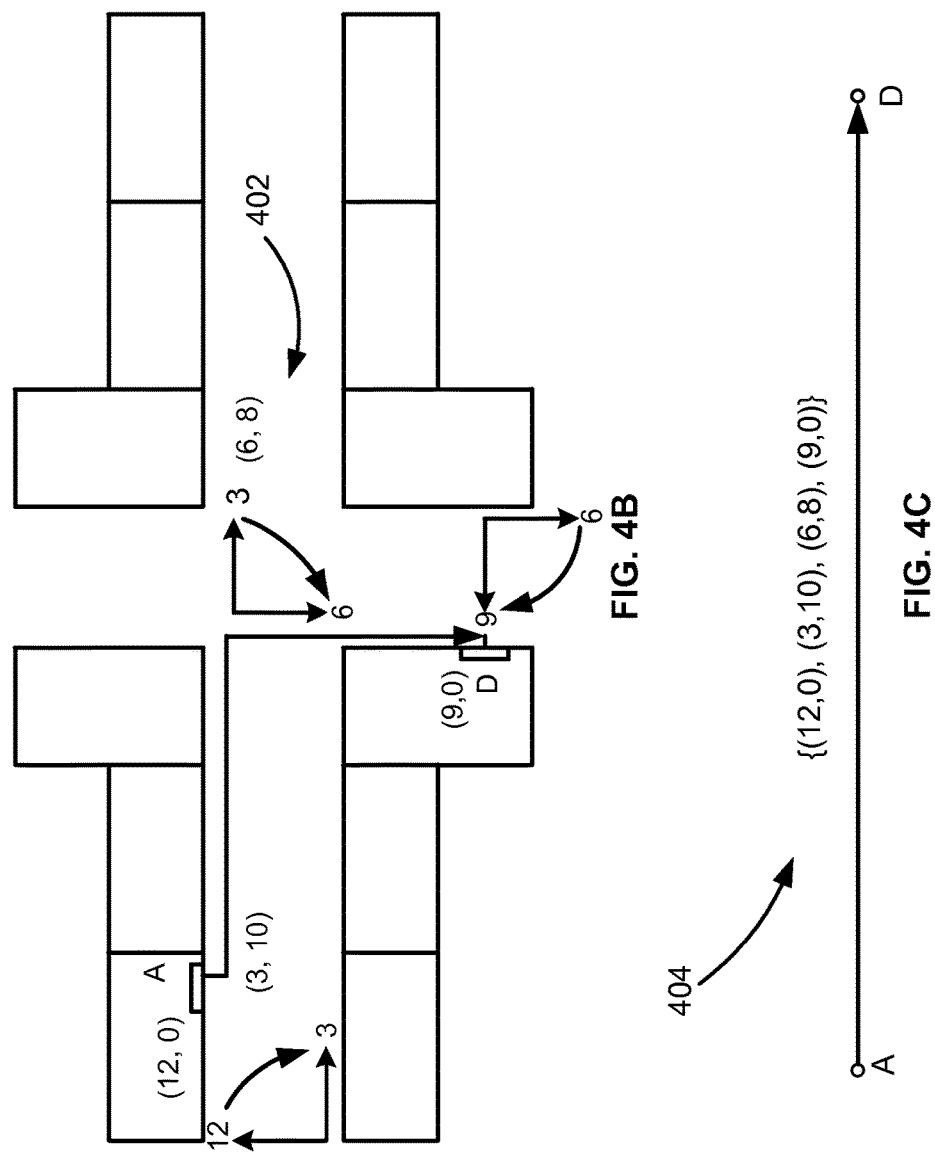

SENSOR-LESS INDOOR NAVIGATION ASSISTANCE

This application claims priority under 35 U.S.C. § 119 to Provisional Patent Application 61/913,246, filed on Dec. 6, 2013, titled "INDOOR NAVIGATION ASSISTANCE", which is incorporated herein by reference in its entirety.

BACKGROUND

Portable electronic devices, for example, cellular or satellite telephones, laptop computers, personal digital assistants, electronic book readers, and the like, are fast becoming prevalent in everyday life. One of the services that have increased the desirability of these devices is the navigation guidance service that provides navigation guidance to an end user. Typically, these devices are equipped with one or more sensors for providing navigation guidance to the end user. For example, a portable communication device, may include, inertial or motion sensors (e.g., accelerometers, gyroscopes, compasses, etc.) capable of measuring locations, or orientations of the device, or Global Positioning System (GPS) receivers that may estimate geographic location of the device and then provide navigation guidance to a user based on the location.

One of the main issues with sensor based navigation guidance is the dependence on the measurement accuracy of the sensors. For example, the navigation guidance may be dependent on the accuracy of mobile device orientation measured by a compass sensor. Additionally, the quality of sensor based navigation guidance may also vary in different environments. For example, the quality of GPS sensor based navigation guidance may be low in an indoor environment, due to the low signal strength.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

FIGS. 4A-4C is an exemplary block diagram illustrating a process for generating a directed-weighted graph, according to an embodiment.

DETAILED DESCRIPTION

Embodiments of techniques for indoor navigation assistance are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment. Thus, the appearances of these phrases in various places throughout this specification are not necessarily all referring to the same embodiment. Furthermore, the particular features, structures, or characteristics may be combined in any suitable manner in one or more embodiments.

Figure 1:
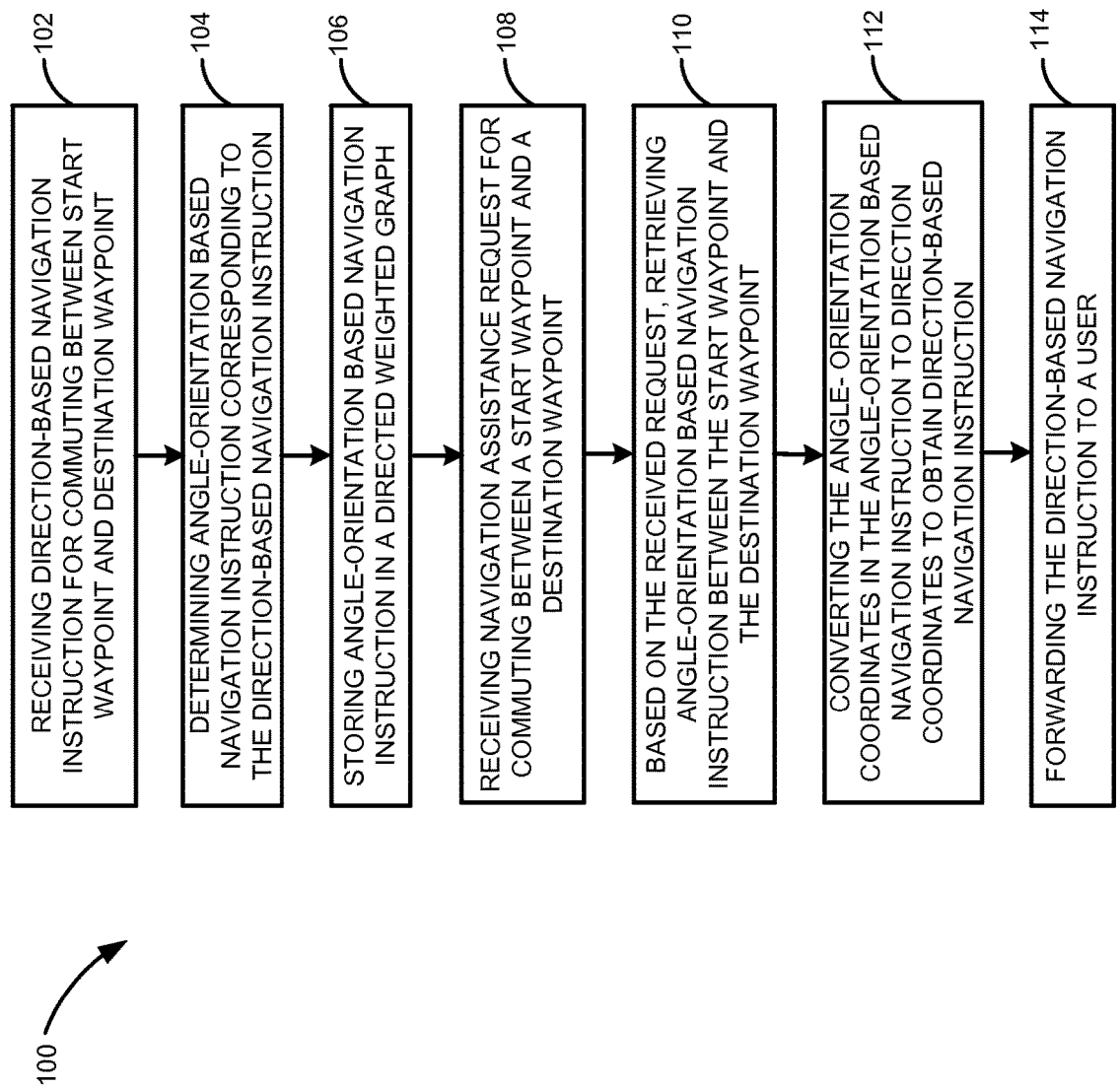
FIG. 1 is a block diagram illustrating a process for providing sensor-less navigation assistance, according to an embodiment.

FIG. 1 is a block diagram illustrating a process 100 for providing sensor-less navigation assistance, according to an embodiment. Navigation is a process of following a route between two locations. In one embodiment, providing navigation assistance includes guiding a user to commute between two locations. The navigation instruction provided to the user may be a direction-based navigation instruction. A direction-based navigation instruction includes direction coordinates and distance coordinates. The direction coordinates represent the directions, for example left or right, to be followed for commuting between the start and the destination waypoint, and the distance coordinates represent the distance to be travelled in the particular direction. For example, a direction-based navigation instruction between a coffee store and a parking lot may include three direction-distances coordinate pairs {(right, 6), (left, 7), (right, 8)}.

In one embodiment, the navigation assistance may be provided for indoor navigation. For example, the navigation assistance may be provided for commuting between the main entry and the meeting room on the third floor of a building. In this case, the direction-based navigation instruction may include instructions, for example, turn left from the main entry, take the stairs to the third floor, turn left and walk twenty steps along the corridor, and finally turn right and walk ten steps to reach the meeting room. In one embodiment, the navigation assistance may be provided via a portable electronic device. The portable electronic device may be a handheld or wearable electronic device, for example, mobile phone, tablet computer, laptop, personal digital assistant, intelligent eyewear, etc. In one embodiment, the navigation assistance may be provided without utilizing any sensors, such as accelerometer, compass and gyroscopic sensor, Global Positioning System (GPS), etc. In one embodiment, the navigation assistance may be provided as an add-on software component to a room booking application, for example, Room Booker by SAP®. A room booking application allows a user to book a room, for example a conference room, a meeting room, etc., for a fixed period of time. The navigation assistance add-on component may provide navigation assistance to the user along with the room-booking application provided by the room-booker software. For example, the navigation assistance add-on component may allow a user to commute between the user's current location and a room booked by the user using the room booking application.

To receive the sensor-less navigation assistance, initially at 102, a direction-based navigation instruction is received for commuting between the start waypoint and the destination waypoint. The direction-based navigation instruction may be received from a user. The user commutes between the start waypoint and the destination waypoint to record the direction-based navigation instruction. A waypoint is a place with a known descriptive position. The descriptive position may be represented by a set of strings which is unique for a particular location, for example, a building name, a room name, etc. Waypoints may also be moving objects, for e.g., a bus of line "A". In this case, navigation instructions may be "take the tram to the central square, wait there until the bus of line "A" arrives. The recorded direction-based navigation instruction includes direction coordinates and distance coordinates. For example, a direction-based navigation instruction for commuting between a waypoint X to a waypoint Y may be {(right, 6), (left, 9)}.

In one embodiment, the direction-based navigation instruction is received at the portable electronic device. The user may use a mobile phone application to record the direction-based navigation instruction. The mobile application may include different direction options, for example, left, right, up, down, etc. The user records the direction co-ordinates by selecting one of the direction options displayed on the portable electronic device. For example, when the user recording the direction-based navigation instruction turns right then the user may select the right arrow on screen to record the direction-based navigation instruction. Similarly, the user may also provide the distance coordinates value at the portable electronic device to record the distance coordinates of the direction-based navigation instruction.

Next, an angle-orientation based navigation instruction corresponding to the received direction-based navigation instruction is determined (104). An angle-orientation coordinate represents a direction coordinate by an angle. To determine the angle-orientation based navigation instruction initially an angle-orientation is assigned to the start waypoint. Based on the angle-orientation assigned to the start waypoint, an angle-orientation is then determined corresponding to the direction coordinates included in the direction-based navigation instruction. In one embodiment, the angle-orientation based navigation instruction is a clock-orientation based navigation instruction that represents a direction coordinate by a clock-orientation coordinate, for example, 12 o'clock, 3 o'clock, 6 o'clock, and 9 o'clock. In one embodiment, the angle 90 degrees is represented by 3 o'clock, the angle 180 degrees is represented by 6 o'clock, the angle 360 degrees is represented by 9 o'clock, and the angle 0 degrees is represented by 12 o'clock. A clock-orientation based navigation instruction represents direction instruction by clock-orientation. The clock-orientation based navigation instruction includes clock-orientation coordinates and the distance coordinates. To determine the clock-orientation based navigation instruction, initially a clock-orientation coordinate, for example 12 o'clock, is assigned to the start waypoint. The start waypoint may be assigned any other clock-orientation, for example, 3 o'clock or 6 o'clock.

Next, angle/clock orientation coordinates are determined corresponding to the direction coordinates of the direction-based navigation instruction, based on the angle/clock orientation assigned to the start waypoint. For example assume that the received direction-based navigation instruction between an office and a meeting room is {(right, 10), (right, 6), (right, 0)}. Based on the clock-orientation of 12 o'clock assigned to the office (start waypoint), the clock-orientation for the first direction coordinate "right" is 3 o'clock as 3 o'clock is at right with respect to the clock-orientation 12 o'clock. Similarly the clock-orientation for the second direction-coordinate "right" is 6 o'clock. The clock-orientation for the destination waypoint "meeting room" is 9 o'clock. In the example above, the obtained clock-orientation based navigation instruction that includes the clock-orientation coordinates and the distance coordinates is {(12, 0), (3, 10), (6, 6), (9, 0)}.

Next, the determined angle-orientation based navigation instruction is stored in a directed weighted graph (106). In one embodiment, the determined clock-orientation based navigation instruction is stored in the directed weighted graph. A directed graph is a graph, or set of nodes connected by edges, where the edges have a direction associated with them. A directed weighted graph includes a weight assigned to the edge in the graph. In one embodiment nodes, corresponding to the start waypoint and the destination waypoint, are inserted in the graph. An edge is then inserted between the start waypoint node and destination waypoint node. The edge represents a path between the start waypoint and the destination waypoint. The determined clock-orientation based navigation instruction is then assigned as weight of the edge. The assigned clock-orientation based navigation instruction is stored by the edge of the directed weighted graph. The directed weighted graph may include several node pairs depending on the number of start-destination waypoint pairs for which the direction-based navigation recording is received. For example, when a user records direction-based navigation recording between an office and meeting room then two nodes are inserted in the directed graph corresponding to the office and meeting room. An edge representing a path is then inserted between the office and meeting room nodes. The clock-orientation based navigation instruction is then assigned as a weight of the edge.

Next, a navigation assistance request is received to commute between a start waypoint and a destination waypoint (108). In one embodiment, a user's present location may be determined as the start waypoint. The user is then provided a list of potential destination waypoints where the user may want to commute. The user may select one of the destination waypoints for which the user wants navigation assistance. In one embodiment, the navigation assistance is received for commuting between the start waypoint, which is the current location of the user, and a destination waypoint.

At 110, based on the received request, an angle-orientation based navigation instruction between the start and destination waypoint is retrieved. In one embodiment, the clock-orientation based navigation instruction is retrieved. The clock-orientation based navigation instruction is retrieved from the directed weighted graph that stores several clock-orientation based navigation instructions. The clock-orientation based navigation instruction may be retrieved based on the start and destination waypoint included in the navigation assistance request.

Next, at 112, the angle-orientation coordinates in the retrieved angle-orientation based navigation instruction are converted to direction coordinates to obtain a direction-based navigation instruction. The obtained direction-based navigation instruction is forwarded to the user (114). In one embodiment, the obtained direction-based navigation instruction is provided at a portable electronic device of the user. In the example described in the previous paragraph, the instruction starting from waypoint 12 o'clock and turning to 3 o'clock is translated to "turn right" because facing 12 o'clock and then turning right is 3 o'clock. Similarly the other clock-orientation coordinates are converted to obtain direction-distance coordinates {("turn right", 10), ("turn right", 5), ("turn right", 0)}. The obtained direction-based navigation instruction is then provided to a user. Storing the navigation instruction in an angle-orientation format allows the portable electronic device to provide a sensor-less navigation guidance. In case the direction-based navigation instruction is provided to the portable device instead of the angle-orientation based navigation instruction then the portable electronic device requires different sensors, for example, GPS sensor, compass, etc., to determine user's position and then identify the direction instruction, left or right, based on the user's position. However, as the stored angle/clock-orientations are fixed instructions, which are independent of user's geographical position and location, the portable electronic device does not require a sensor to provide navigation assistance to a user.

The angle-orientation based navigation instruction provides several other advantages. For example, when the angle-orientation based navigation instruction for a path between a start and destination waypoint is received then the angle/clock orientation based navigation instruction for the reverse path between the destination waypoint to the start waypoint may be auto-determined by reversing the angle/clock orientation. This reduces the manual effort of recording navigation instruction for a reverse path. For example, consider that a direction-based navigation instruction is received for a path between point A and point B. The direction-based navigation instruction is converted to angle-based navigation {(0, 0), (90, 10), (180, 7), (270, 0)}. The obtained angle based navigation instruction may then be used to determine clock-orientation for the reverse path between B and A, by reversing sequence of angle orientation-distance coordinates and then reversing angle orientation of intermediate coordinates. Based on this, the angle-orientation based navigation instruction for the reverse path between the destination waypoint and the start waypoint is {(270, 0), (0, 7), (270, 10), (0, 0)}.

Figure 2:
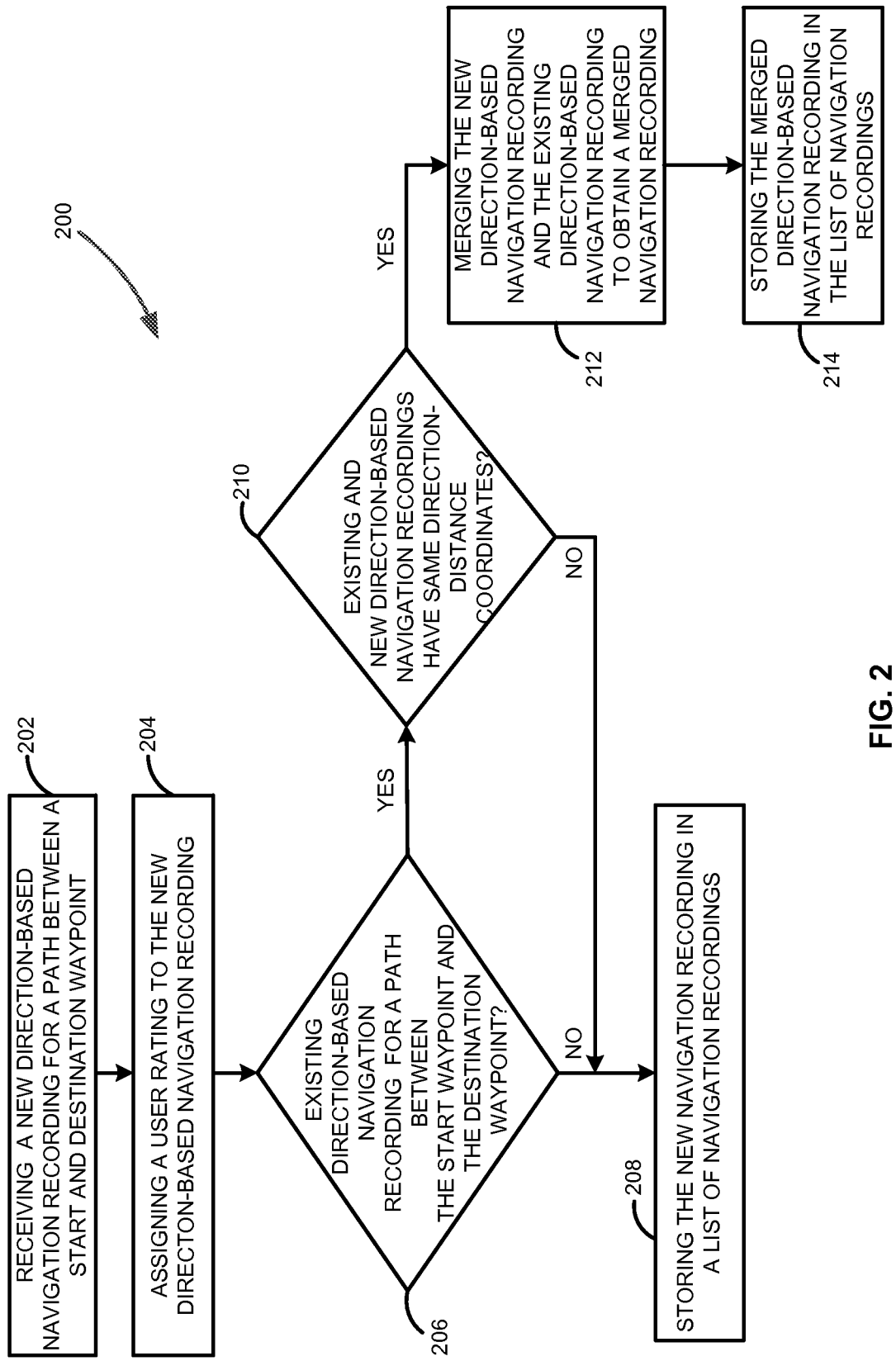
FIG. 2 is a detailed flow diagram illustrating a process to determine and store a clock-orientation based navigation instruction for a path between a start waypoint and a destination waypoint, according to an embodiment.

FIG. 2 is a detailed flow diagram 200 illustrating a process to determine and store an angle-orientation based navigation instruction for a path between a start waypoint and a destination waypoint, according to an embodiment.

Initially a new direction-based navigation recording for a path between a start waypoint and a destination waypoint is received (202). In one embodiment, the new direction-based navigation recording is a first recording received from a user. In another embodiment, the new direction-based navigation recording may be received after receiving several existing direction-based navigation recording from the same or different users. A direction-based navigation recording includes a direction based navigation instruction for commuting between the start waypoint and the destination waypoint. The new direction-based navigation recording may be received at a portable electronic device. To initiate the recording, the user presses the start button. A camera of the portable electronic device may then be activated to scan a barcode of the start waypoint. The user then selects the first direction, from the direction options provided by the mobile application, towards the destination waypoint. The user then commutes between the start waypoint and the destination waypoint and selects direction options whenever crossing an intersection or a waypoint. In one embodiment, the direction options are selected assuming that the paths are at 90 degrees, or right angles, with respect to each other. The mobile application also allows the user to record floor change instructions, for example, stairs up, stairs down, etc. In one embodiment, when the direction-based navigation recording is for a path that includes several waypoints then the recording may be split into several recordings with one start waypoint and destination waypoint. For example, assume that the path between the start waypoint A and the destination waypoint B includes an intermediate waypoint C then the direction-based navigation recording may be split into two recordings A-B and B-C. In one embodiment, the user may provide the direction-based navigation recording as voice instructions, by motion, or other mechanism. In one embodiment, sensors, for example, compass may be used to record a user's initial position and the direction changes encountered by the user while commuting from the start waypoint to the destination waypoint.

In one embodiment, the new direction-based navigation recording also includes a navigation metadata. The navigation metadata may include the start and destination waypoints related metadata, and path related metadata. For example, the start and the destination waypoints related metadata may be that the start waypoint is an employee cubicle and the destination waypoint is an office cafeteria. The navigation metadata for a path may include data that may be helpful during navigation, for example, whether the path is reversible or whether it is restricted. Reversibility of path indicates whether the path may be traversed in both directions, i.e., both from the start waypoint to the destination waypoint and from the destination waypoint to the start waypoint. In case the path is not reversible, then the path may be traversed only in one direction, for example: when the path includes a unidirectional turnstile. In one embodiment, the metadata may also include different restrictions to traversing the paths, e.g. if the path may be traversed by a defined user group like facility employees only, or if the path may not be traversed by wheelchair, etc.

In one embodiment, crowd-sourcing is used for receiving the navigation recording. Crowd-sourcing is the practice of obtaining needed services, ideas, or content by soliciting contributions typically, but not necessarily, from a large group of users. Each user, contributing to the navigation recording, may be assigned an initial score, for example 1. In one embodiment, gamification techniques are used to maintain a user's score. Gamification technique includes method for rewarding players who accomplish a task. Types of rewards include scores, achievement badges, position on a progress bar, etc. The initial score of the user contributing to the navigation recording may be increased in two scenarios: 1) whenever the user records a new direction-based navigation recording, or 2) when the user's recording is confirmed by another user's feedback. A user's navigation recording is confirmed when another user submits a direction-based navigation recording with same direction-distance coordinates as included in the user's direction based navigation recording.

Next, at 204 a user rating is assigned as a rating of the new direction-based navigation recording. The user rating is the rating of the user that recorded the direction-based navigation recording. Next, at 206 a check is performed to determine whether there is an existing navigation recording for a path between the start waypoint and the destination waypoint. In one embodiment, the existing navigation recording includes recordings previously received from the different users. The existing navigation recordings are stored in a server, for example, cloud server. The existing navigation recording includes direction-based navigation instruction and navigation metadata. In case the list of existing navigation recordings does not include a direction-based navigation recording for a path between the start waypoint to the destination waypoint then the new navigation recording is stored in the list of recordings (208). Alternatively, in case there is an existing navigation recording from the start waypoint to the destination waypoint (condition in 206 is true) then a check is performed, at 210, to determine whether the direction-distance coordinates of the new navigation recording and the direction-distance coordinates of the existing navigation recording are same.

Based on the comparison, when the direction-distance coordinates in the new-navigation recording and the existing-navigation recording is same then both the recordings are merged (212). Merging the navigation recordings include merging the distance information included in the navigation recordings and the metadata, including the user rating, of the new and existing navigation recording to obtain a merged navigation recording. The merged navigation recording includes direction-based navigation instruction between the start waypoint and the destination waypoint. The obtained merged navigation recording is then stored in the list of existing navigation recordings (214).

For example, consider that a new direction-based navigation recording, between a waypoint A and a waypoint B, is received from a user having a rating 2. The user rating 2 is assigned as the rating of the recording. The new direction-based navigation recording is:

```
{recording: {
start: "Waypoint A";
startType:["Meeting Room"];
destination: "Waypoint B";
destination type:["Kitchen"];
reversible: True;
rating: 2;
instructions: [{"right", 11}, {"straight", 5}, {"left", 13}, {"left", 8}];
}}
```

Further assume that an existing navigation recording, between the waypoint A and the waypoint B, received from a user having a rating 1. The user rating 1 is assigned as the rating of the existing direction-based navigation recording. The existing direction-based navigation recording is:

```
{recording: {
start: "Waypoint A";
startType:["Meeting Room"];
destination: "Waypoint B";
destination type:["Kitchen"];
reversible: False;
rating: 1;
instructions: [{"right", 9}, {"straight", 5}, {"left", 11}, {"left", 8}]
}}
```

A merging operation is performed on the new direction-based navigation recording and the existing direction-based navigation recording for the path between waypoints A and B to obtain the merged direction-based navigation recording. In one embodiment, during the merging operation the user ratings 1 and 2 of the new and existing navigation instruction, respectively, are summed and the obtained rating (3) is assigned to the merged navigation recording. Similarly, the distance coordinates included in the new and existing navigation recordings are averaged to obtain the distance coordinates of the merged direction-based navigation recording. The merged direction-based navigation recording includes:

```
{recording: {
start: "Waypoint A";
startType:["Meeting Room"];
destination: "Waypoint B";
destination type:["Kitchen"];
reversible: True;
rating: 3;
instructions: [{"right", 10}, {"straight", 5}, {"left", 12}, {"left", 8}];
}}
```

In case the existing navigation recording has different direction-distance navigation coordinates than the new navigation recording (condition in 210 is false), then the new navigation recording is stored as a separate recording in the list of recordings.

Figure 3:
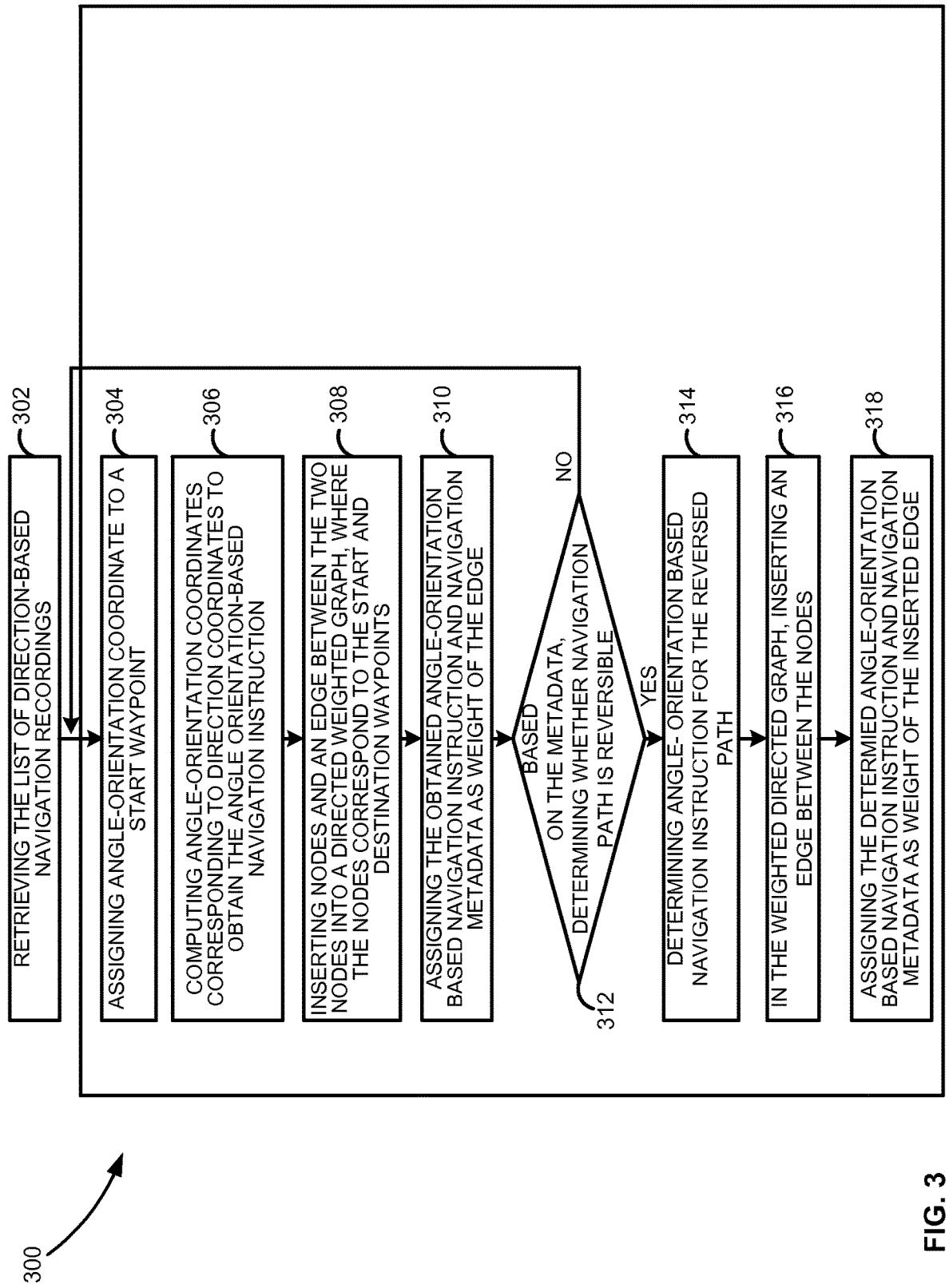
FIG. 3 is a flow diagram illustrating a process for generating a directed weighted graph based on the stored list of direction-based navigation recordings determined in FIG. 2, according to an embodiment.

FIG. 3 is a flow diagram 300 illustrating a process for generating a directed weighted graph based on the stored list of direction-based navigation recordings determined in FIG. 2, according to an embodiment. The directed-weighted graph represents the stored list of direction-based navigation recordings. In one embodiment, the directed-weighted graph represents the start and destination waypoints as nodes and a path between the start and destination waypoints as an edge between the nodes. The existing navigation recording for a path is assigned as weight of the edge. The directed-weighted graph includes at least one edge corresponding to each of the existing navigation recordings. For example, consider that there are three existing navigation recordings for navigation paths A⁻ B, B⁻ C, and C⁻ D. A directed-weighted graph may then be generated that includes four nodes corresponding to the four waypoints A, B, C, and D. Three edges, representing the navigation paths, are then inserted between nodes A and B, B and C, and C and D. The three edges between nodes A⁻ B, B⁻ C, and C⁻ D store the navigation recordings for the corresponding navigation paths.

For generating the directed weighted graph, initially the list of direction-based navigation recordings are retrieved (302). In one embodiment, the list of direction-based navigation recordings is the list of existing recordings stored in the memory. The list of recordings may be filtered based on user ratings and the recording with a higher rating may be considered for generating the directed weighted graph.

Next, 304-318 may be repeated for each of the direction-based navigation recording in the list of direction-based navigation recordings, to generate a single directed weighted graph. The single directed weighted graph includes nodes and directed edges that store a weight. The nodes of the graph represent waypoints, the edges of the graph represent paths, and the weight of the edges represents navigation instructions and navigation metadata. To determine the directed weighted graph, initially angle-orientation based navigation recordings corresponding to the list of existing direction-based navigation recordings are determined. The single directed weighted graph may then be generated based on the determined angle-orientation based navigation recordings. The angle-orientation based navigation recording is determined by assigning an angle-orientation coordinate to a start waypoint (304). The start waypoint is the starting point for an existing direction-based navigation recording, stored in the list, which is being processed.

Angle-orientation coordinates are then determined corresponding to the direction coordinates in a direction-based navigation recording from the list of direction-based navigation recordings (306). The angle-orientation coordinates are determined based on the angle-orientation assigned to the start waypoint. In one embodiment, a clock-orientation coordinates are determined corresponding to the direction coordinates in the direction-based navigation recording. The clock-orientation coordinates is determined by assuming 90 degree corners at intersection but is not limited to that angle. An angle-orientation coordinate may be determined corresponding to each direction coordinate included in the direction-based navigation instruction. In one embodiment, the direction coordinates "stair up" or "stair down" are not converted to clock-orientation coordinates. These instructions, "stair up", "stair down", are fixed instructions that do not change based on user's geographical position/location.

Next, nodes corresponding to the start and the destination waypoints, of a direction-based navigation recording, and an edge connecting the nodes are inserted into a directed weighted graph (308). In case the existing navigation instruction is the first existing navigation instruction in the list then the two nodes are the first two nodes inserted in the graph. In case the existing navigation recording being processed is not the first node in the list of existing nodes then the node is inserted depending on the nodes already inserted in the graph. For example, consider a first direction-based navigation recording for a path between points A and B and a second direction-based navigation recording between points B and C. In this case two nodes A and B representing points A and B, respectively, are inserted in the graph. Next, for the second navigation instruction a single node C is inserted adjacent to node B is inserted in the graph. An edge connecting the nodes may also be inserted in the directed weighted graph. An edge represents the path between the start and the destination waypoint. In one embodiment, when there are more than one paths for commuting between the start and destination waypoints then the directed weighted graph may include several edges between the start waypoint and destination waypoint that represent the different paths. For example, when the list of recordings include two navigation recordings, corresponding to two paths between a start waypoint and destination waypoint, for commuting between the start waypoint and the destination waypoint then two edges representing the two different recordings may be inserted in the directed weighted graph. In another embodiment, a single edge corresponding to the navigation instruction, from among the different navigation instructions, with a higher user-rating is inserted in the graph.

Next, the angle-orientation based navigation instruction and the navigation metadata are assigned as weight of the edge (310). In one embodiment, a clock-orientation based navigation instruction is assigned as weight of the edge. For example, consider that the clock-orientation based navigation instruction for a path between a classroom and a physic laboratory is {(12, 0), (3, 10), (6, 6), (9, 0)}. Two nodes corresponding to the classroom and the physics laboratory are inserted in the directed weighted graph. An edge that represents the path between the classroom and the physics laboratory may then be inserted in the graph to connect the classroom node and physics laboratory node. Next, the clock based navigation instructions {(12, 0), (3, 10), (6, 6), (9, 0)} is assigned as weight of the edge connecting the classroom node and the physics laboratory node in the directed weighted graph.

Next, a determination is made whether the navigation path is reversible based on the navigation metadata (312). In one embodiment, the navigation metadata of a navigation path is checked to determine whether the navigation path is reversible. In case the navigation path is reversible then an angle-orientation based navigation instruction is determined for the reverse navigation path, i.e., from the destination waypoint to the start waypoint (314). In one embodiment, a clock-orientation based navigation instruction is determined for the reverse path. The navigation instruction for the reverse path may be determined by initially reversing the sequence of angle/clock orientation-distance coordinates in the angle/clock orientation based navigation instruction. Next the opposite angle/clock orientation coordinates for the intermediate angle/clock-orientation-distance coordinates that are not representing the start and the destination waypoint is determined. The opposite angle-orientation based navigation coordinates may be determined by adding 180 degrees to the angle coordinates in the intermediate angle-distance coordinates. In case of clock-orientation based navigation instruction, the reverse clock-orientation may be obtained by adding 6 modulo 13 plus 1 to the clock-orientation of the intermediate clock-orientation-distance pairs. In the example described in the previous paragraph, assume that there is a reverse path from the physics laboratory to the classroom. In this case, the navigation instruction for the reverse path may be obtained by reversing the sequence of clock-orientation based navigation instructions {(12, 0), (3, 10), (6, 6), (9, 0)} to obtain {(9, 0), (6, 6), (3, 10), (12, 0)}. Next, the clock-orientation (6, 6) and (3, 10) that do not represent the classroom and physics laboratory waypoints are reversed to obtain {(9, 0), (12, 6), (9, 10), (12, 0)} the clock based navigation instruction of the path in the reversed direction, from the physics laboratory to the classroom.

An edge connecting the nodes may then be inserted in the graph (316). The inserted edge represents a path from the destination waypoint to the start waypoint. In the example which is described in the previous paragraph, an edge may be inserted to connect the physics laboratory node to the classroom node. Finally, the determined angle/clock-based navigation instructions and metadata of the reverse path are assigned as weight of the inserted edge (318). The weighted graph therefore allows auto-determination of navigation instruction for a reverse path when the navigation instruction of the forward path is received.

Storing the existing list of navigation recordings in a single directed weighted graph allows the system to determine navigation instruction for a path, between two waypoints, which do not have a navigation recording. For example, assume that a navigation recording is received for path between point A to point B, and another navigation recording is received for a path between point B and point C. Both the navigation recordings are stored in the directed weighted graph. In case a user wants to commute between points A to C then a path determination algorithm may be executed on the graph to determine navigation instruction to commute between points A to C (A⁻ B⁻ C).

Further, the directed-weighted graph also assists in determining a shorter path, then the path suggested by the navigation recording, between two waypoints. The shorter path may be determined by comparing navigation instructions for paths that have a common start waypoint and different destination waypoints. A comparison is performed between the navigation instructions to determine whether the paths overlap until a particular intersection waypoint and then diverge to the different destination waypoints. The shorter path is then determined as the path between the two destination waypoints via the intersection waypoint. For example, consider that the directed weighted graph stores a first clock-orientation based navigation instruction for a path between an office and a coffee machine and a second clock-orientation based navigation instruction for a path between the office and a library. The navigation instructions for the two paths are compared to identify that the paths overlap until an intersection point and from there diverge to library and coffee machine. Based on the identified intersection point, a shortened path is determined between the coffee machine and the library via the intersection. In case a user wants to commute between the coffee machine and the library then the user can directly reach library via the intersection skipping the detour via the office.

Figure 4A:
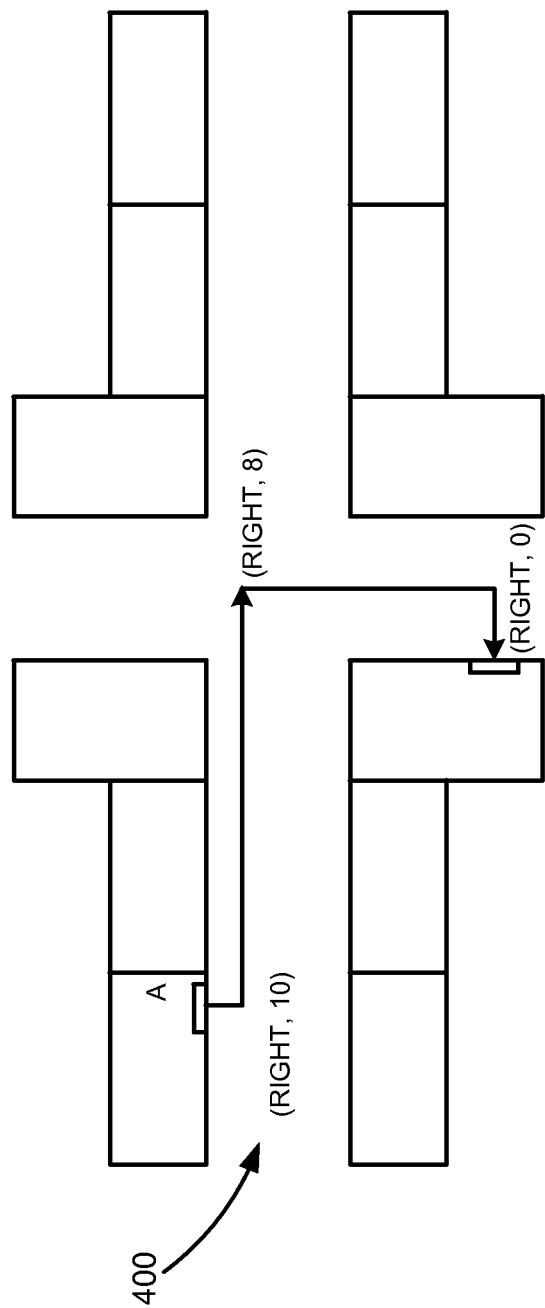

FIGS. 4A-4C is an exemplary block diagram illustrating a process for generating a directed-weighted graph, according to an embodiment. Initially as shown in FIG. 4A a direction-based navigation instruction 400 to commute between a start waypoint A and a destination waypoint D is received. The received direction-based navigation instruction is turn right from A and take 10 steps, then turn right and take 8 steps, and finally turn right to reach destination waypoint D. The obtained direction-based navigation instruction includes three direction-distance coordinate pairs {(right, 10), (right, 8), (right, 0)}. Next, the direction-based navigation instruction is converted to clock-orientation based navigation instruction. FIG. 4B illustrates the clock-orientation based navigation instruction 402 corresponding to the direction-based navigation instruction 400. Initially a clock coordinate is assigned to the start waypoint A. In this case, the start waypoint A is assigned a clock-orientation 12 o'clock. Based on the assigned clock-orientation, clock-orientation coordinates corresponding to direction coordinates in the direction-based navigation instruction is determined. For the direction coordinate "right" (turn right from A) the clock coordinate is 3, as the clock-orientation is 3 o'clock when a user turns at right angle from the clock-orientation 12 o'clock. Similarly, the clock-orientation for the second direction coordinate "right" is 6 o'clock as 6 o'clock is at right angle with respect to the clock-orientation 3 o'clock. Finally, the clock-orientation for the third direction coordinate "right" is 9 o'clock. The clock-orientation based navigation instruction 402 including clock coordinates and distance coordinates is {(12, 0), (3, 10), (6, 8), (9,0)}.

A directed-weighted graph 404, shown in FIG. 4C, is then generated based on the determined clock-orientation based navigation instruction determined in FIG. 4B. The directed weighted graph 404 includes two nodes representing the start waypoint A and destination waypoint D. The two nodes are connected by an edge representing a path between the start waypoint A and destination waypoint D. The clock-orientation based navigation instruction 402 is assigned as a weight of the edge and is stored by the directed weighted graph 404.

Figure 5:
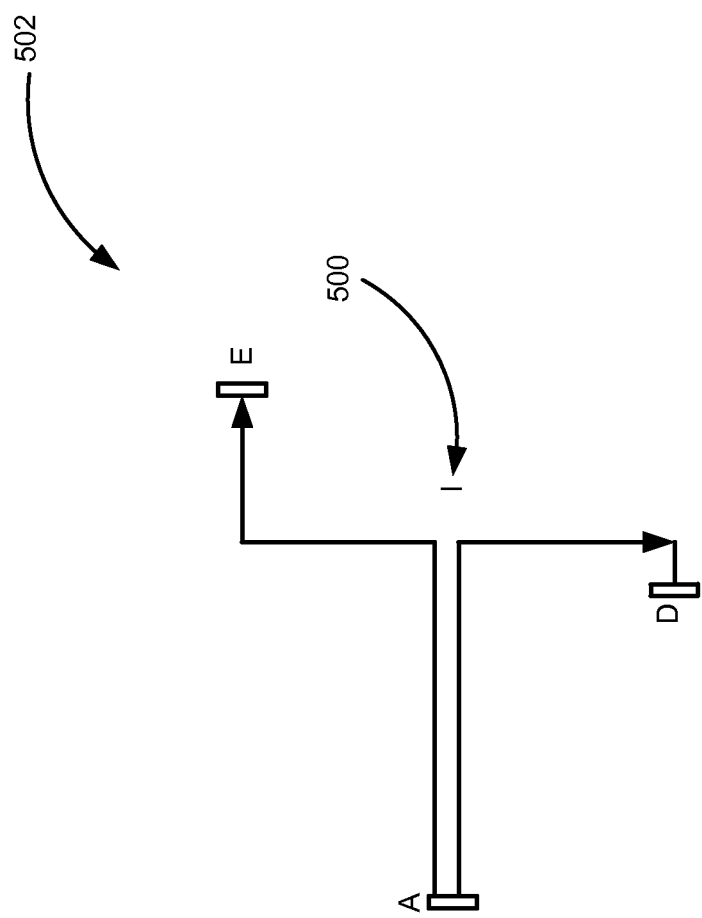
FIG. 5 is an exemplary block diagram illustrating a directed weighted graph including an intersection point, according to an embodiment.

FIG. 5 is an exemplary block diagram illustrating a process to determine an intersection point I 500 in a directed weighted graph 502, according to an embodiment. The directed weighted graph 502 includes two edges connected to a node A. The weight for the edge connecting node A to D is [(12, 0), (3, 5), (6, 3), (9, 0)], which represents the clock-orientation based navigation instruction for a path between waypoints A and E. The weight for the edge connecting waypoints A to E is [(12, 0), (3, 5), (12, 3), (3, 0)], which represents the clock-orientation based navigation instruction for a path between waypoints A and E. To identify the intersection point I 500, the edges starting from each of the nodes A, D, and E are identified. In the weighted graph 502 two edges starting from node A and no edges starting form nodes D and E are identified. Next the angle-orientation based navigation instructions assigned to edges starting from the same node are compared. In this example the two edges starting from node A are compared. In one embodiment, the instruction assigned as weights to the two edges, A to E and A to D, are compared to identify the first non-similar clock-orientation-distance coordinates. Based on the comparison, the first two navigation instructions [(12, 0), (3, 5)] in the two clock-orientation based navigation instructions assigned to edges, A to E and A to D, are identified as same. The third navigation instruction (6, 3) and (12, 3) in the navigation instructions for the navigation paths p(A,E) and p(A,D), respectively, are the first non-similar clock-orientation-distance coordinates. This indicates that both the paths from A to E and A to D overlap until the second clock-orientation-distance coordinates (3, 5) and then diverge at the third clock-orientation-direction coordinates. The divergence implies an intersection I 500 after the second clock-orientation-direction coordinate. A node representing identified intersection point I 502 may be inserted into the graph 500. In this case, the paths p(A,D) and p(A,E) can be split into three paths p(A,I), p(I,D), and p(I,E). In one embodiment, a node may be inserted in the graph corresponding to the determined intersection point I 500. Edges connecting the node D with node I 500, and node E with node I may then be inserted in the directed weighted graph 502. In the example a clock orientation, say 6 o'clock, is assigned to the intersection I 500. The navigation instructions for path p(A,I), p (I,E), and p (I,D) are: p(A,I)=[(12,0), (3,5), (6,0)], p(I,D)=[(6,0), (6,3), (9,0)], and p(I,E)=[(6,0), (12,3), (3,0)].

Intersection detection helps in removing any unnecessary commute by a user utilizing the navigation instructions for commuting. In the example described in the previous paragraph, when the user wants to commute between the waypoints D and E then based on the detected intersection a user is provided a navigation instruction for the path [p(D,I)⁻p(I,E)]. Based on the detected intersection, the user need not unnecessarily travel from the waypoint A (D⁻ A and then A⁻ E) when a user wants to commute between waypoint D to waypoint E via I. The navigation instruction from path waypoint D to intersection I 500 and from intersection I 500 to waypoint E may be combined to obtain the navigation instruction for a path from waypoint D to waypoint E.

Figure 6:
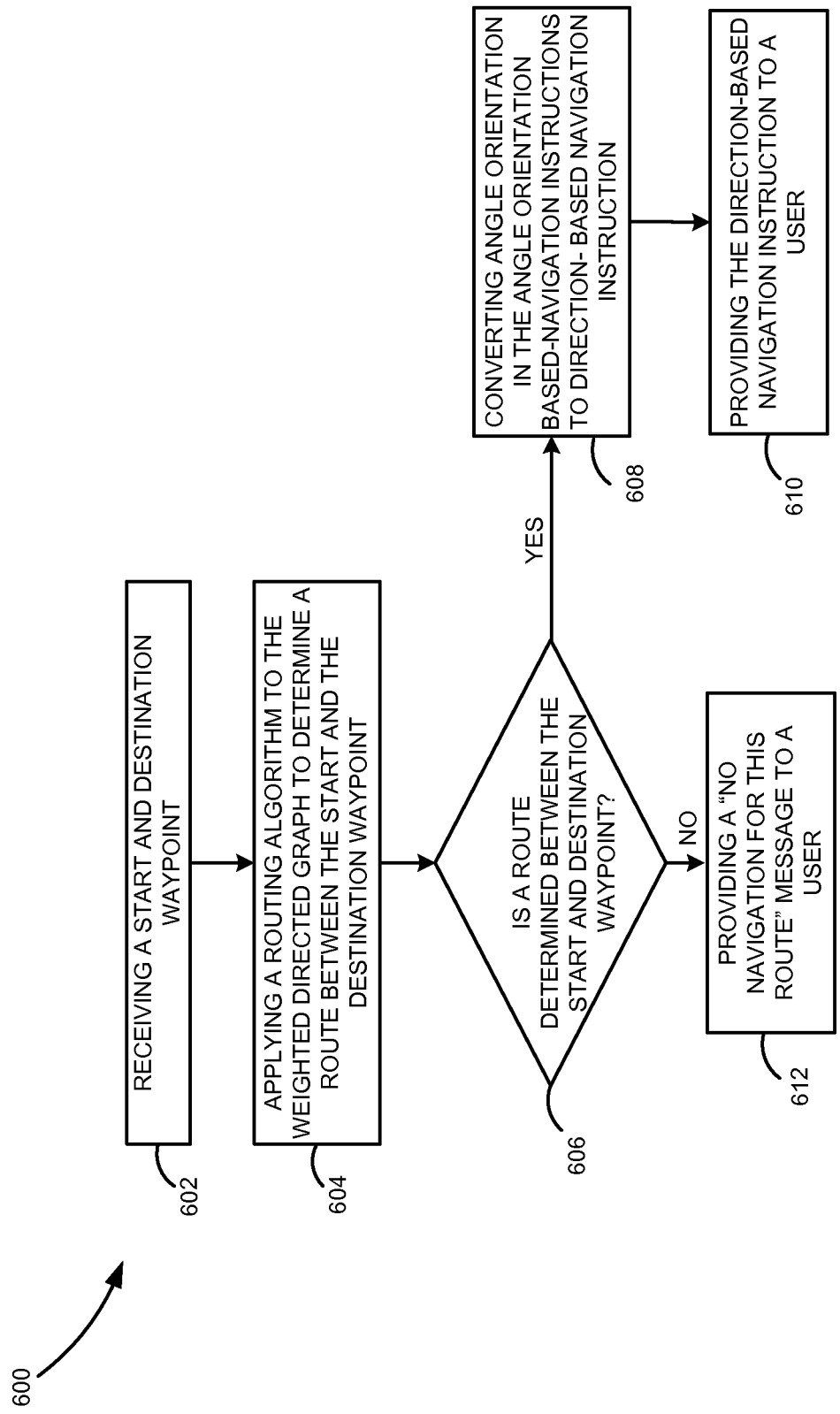
FIG. 6 is a detailed flow diagram illustrating a process for providing sensor-less navigation assistance based on the directed-weighted graph generated in FIGS. 4A-4C, according to an embodiment.

FIG. 6 is a detailed flow diagram 600 illustrating a process for providing sensor-less navigation assistance based on the directed weighted graph, according to an embodiment. Initially a start and destination waypoint is received (602). In one embodiment, the start waypoint may be a current location of the user. In another embodiment, the user may provide the start waypoint by entering their name at the portable electronic device or scanning an ID by the portable electronic device. A list of destination waypoints is then displayed on the portable electronic device based on the received start waypoint. The list of destination waypoints may be determined based on performing a depth-first search on the directed weighted graph. The list of destination waypoints may be filtered based on a destination filter parameter received from the user. For example, when the user provides a destination type filter "cubicle" then the destination waypoints of type "cubicle" are displayed on the portable electronic device. A selection may then be received for a destination waypoint from the displayed list of destination waypoints.

Next, a routing algorithm is applied on the directed weighted graph to determine a navigation route between the start and destination waypoint (604). In one embodiment, a route is a sequence of paths that are traversed to commute between two points. For example, a route r (A, C) may be a sequence of paths p (A, B) and p (B, C). Each navigation path is represented by an edge. A sequence of edges between the nodes, representing the start and destination waypoints, represents a navigation route. A transitivity of a path relation is used to determine the traversing route. According to the transitivity of the path relation when there is a path from A to B and another path from B to C, then a path exist from A to C. Using the transitivity of the graph, a destination waypoint can be reached by traversing intermediate waypoints beginning from the start waypoint. In one embodiment, a shortest path algorithm, for example Dijkstra's algorithm, may be applied to the directed weighted graph to compute a traversing route, which requires the least time to commute between the start and the destination waypoint. In case several routes are identified, they might be filtered based on the user rating to select only the one with the highest rating. The navigation instructions for the start and destination waypoints are retrieved from the directed weighted graph.

In case a route is determined to commute between the start and destination waypoint then the angle/clock-orientation coordinates in the angle/clock-orientation based navigation instructions is converted to direction coordinates to obtain direction-based navigation instruction (608). For example, assume that a user wants to commute between a main entry and meeting room within office campus. The retrieved clock-based navigation instruction, from the directed weighted graph, for a route between main entry and meeting room is [(12, 0), (3, 5), (6, 3), (9, 0)] where 12, 3, 6, and 9 represent clock-orientations. The clock-orientation 12 and 9 represents main entry and meeting room. In one embodiment, the clock-orientation co-ordinate in the navigation instruction is converted to direction coordinates to obtain direction based navigation instruction [("right", 5), ("right", 3), ("right", 0)]. Finally, the obtained direction based navigation instruction is provided to a user (610). In one embodiment, the navigation instruction may be provided by displaying the navigation instructions on the portable electronic device of the user. Alternatively, the navigation instructions may be provided as voice instructions, by colors, or by vibrations, etc. In the example, the user may be initially provided with an instruction to turn right and then take 5 steps. After the user takes the 5 steps, the user may be provided an instruction to turn right and take 3 steps, and finally the user may be instructed to turn right to reach the meeting room. In one embodiment, when a route is not determined between the start and the destination waypoint then a message "no navigation instruction for this route" may be displayed at the portable device of the user (612), or signaled via other media channels as indicated above.

Figure 7:
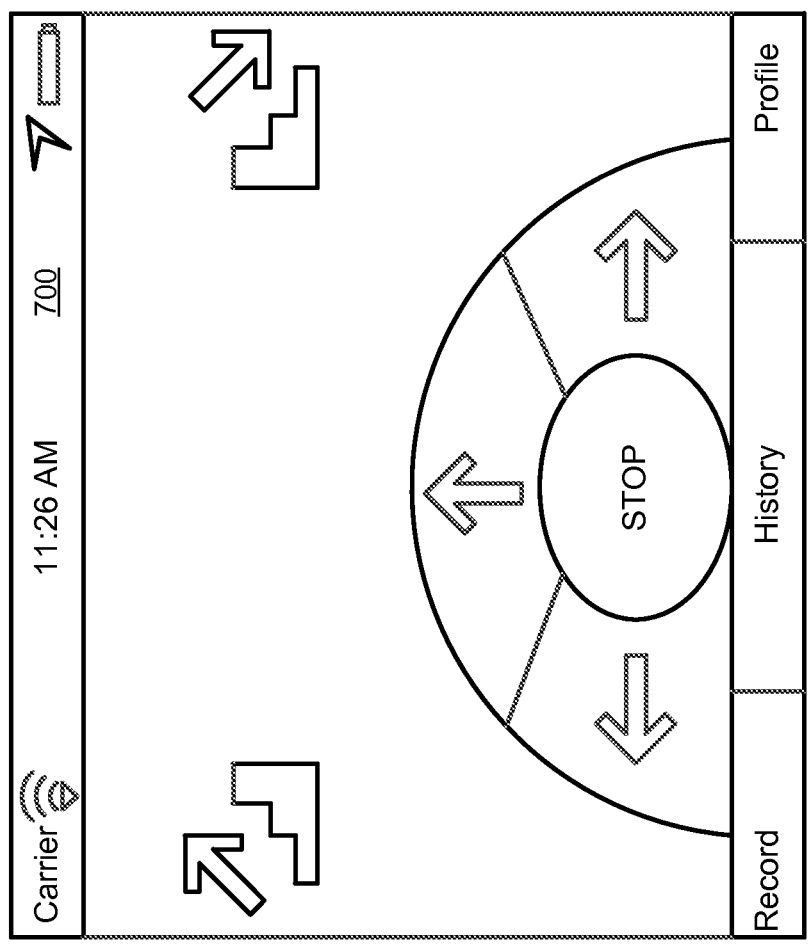
FIG. 7 is an exemplary user interface of a portable electronic device displaying a graphical user interface of path recording application, according to an embodiment.

FIG. 7 is an exemplary user interface 700 of a portable electronic device displaying a graphical user interface of path recording application, according to an embodiment. In one embodiment, a user may use the path recording application to record navigation instruction for a path. The user may select a start option to initiate recording of the navigation instructions for a path. The user may enter a direction leading away from start waypoint, a direction whenever the user traverses an intersection, and finally the direction leading towards the destination waypoint. After the recording, the user may also provide metadata of the start and destination waypoint.

Figure 8:
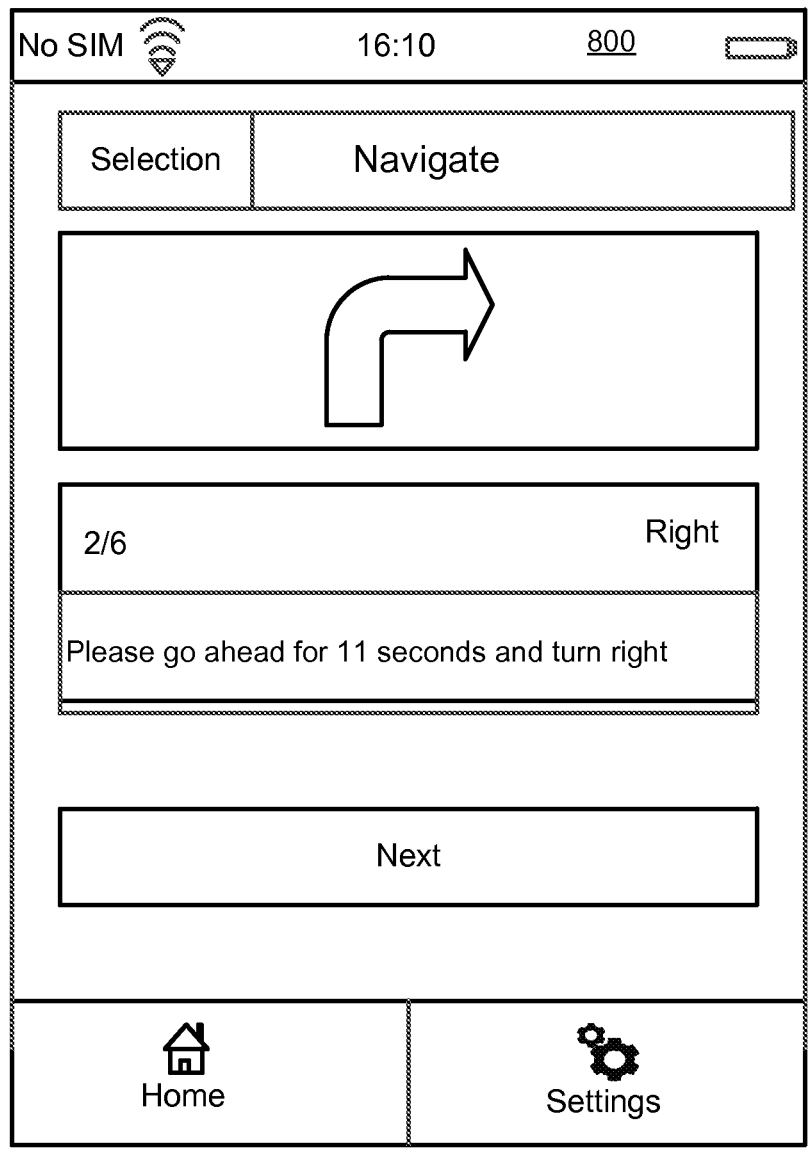
FIG. 8 is an exemplary user interface of a portable electronic device displaying a graphical user interface of a navigation assistance application, according to an embodiment.

FIG. 8 is an exemplary user interface 800 of a portable electronic device displaying a graphical user interface of a navigation assistance application, according to an embodiment. When the user enters their start and destination waypoint the navigation assistance application may display navigation instructions to commute between the start waypoint and the destination waypoint.

Some embodiments may include the above-described methods being written as one or more software components. These components, and the functionality associated may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 9:
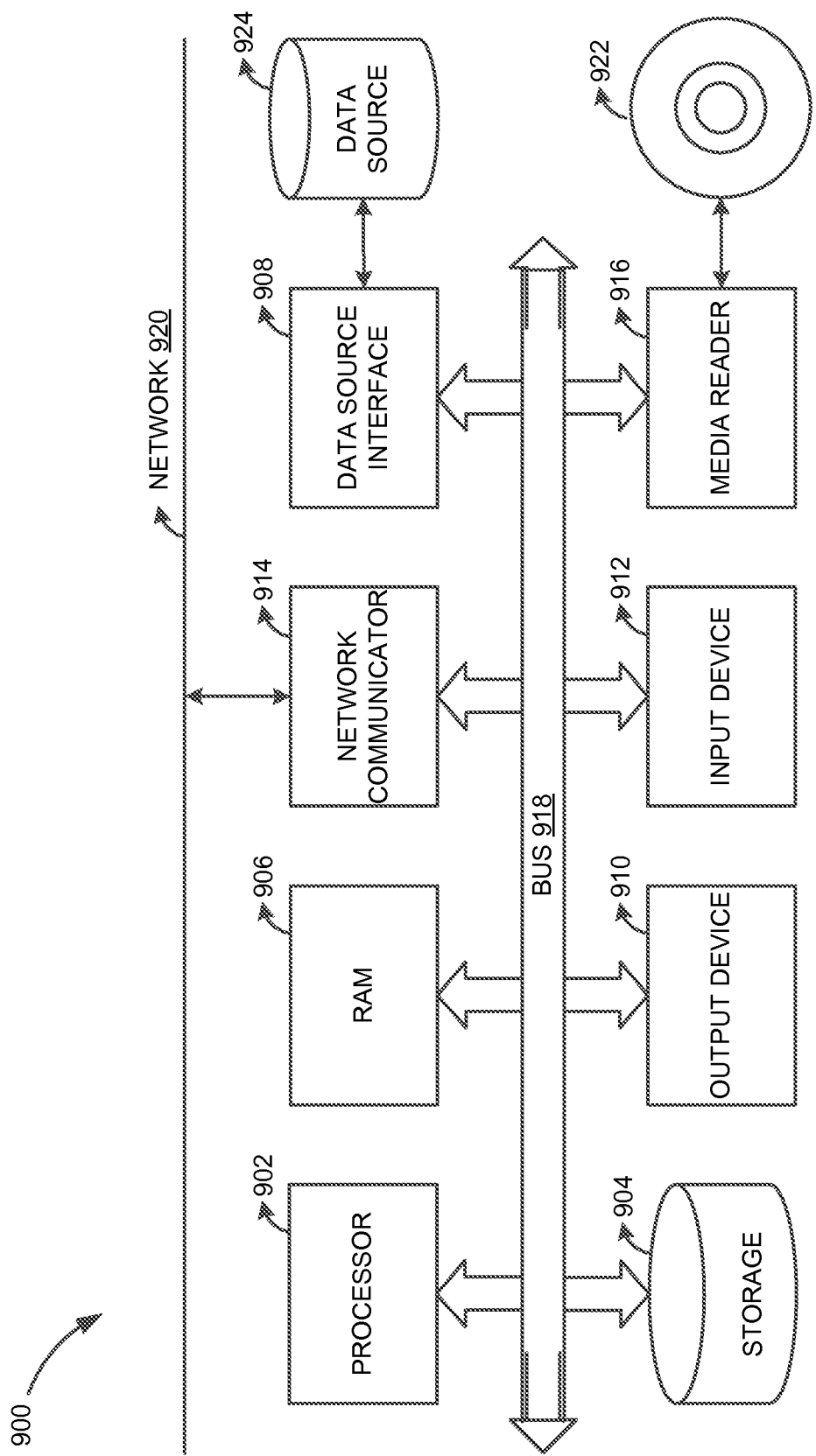
FIG. 9 is a block diagram illustrating a computing environment of indoor navigation assistance, according to an embodiment.

FIG. 9 is a block diagram of an exemplary computer system 900. The computer system 900 includes a processor 902 that executes software instructions or code stored on a computer readable storage medium 922 to perform the above-illustrated methods of the invention. The computer system 900 includes a media reader 916 to read the instructions from the computer readable storage medium 922 and store the instructions in storage 904 or in random access memory (RAM) 906. The storage 904 provides a large space for keeping static data where at least some instructions could be stored for later execution. The stored instructions may be further compiled to generate other representations of the instructions and dynamically stored in the RAM 1006. The processor 902 reads instructions from the RAM 906 and performs actions as instructed. According to one embodiment of the invention, the computer system 900 further includes an output device 910 (e.g., a display) to provide at least some of the results of the execution as output including, but not limited to, visual information to users and an input device 912 to provide a user or another device with means for entering data and/or otherwise interact with the computer system 900. Output devices 910 and input devices 1012 could be joined by one or more additional peripherals to further expand the capabilities of the computer system 900. A network communicator 914 may be provided to connect the computer system 900 to a network 920 and in turn to other devices connected to the network 920 including other clients, servers, data stores, and interfaces, for instance. The modules of the computer system 900 are interconnected via a bus 918. Computer system 900 includes a data source interface 908 to access data source 924. The data source 924 can be accessed via one or more abstraction layers implemented in hardware or software. For example, the data source 924 may be accessed by network 920. In some embodiments the data source 924 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

The claims are as follows:

1. A computer implemented method for providing sensor-less navigation assistance, the method comprising:
   receiving two or more recordings of direction-based navigation instructions from two or more users, the two or more recordings of direction-based navigation instructions being for commuting between a recording start waypoint and a recording destination waypoint, wherein the two or more recordings of direction-based navigation instructions include direction coordinates and distance coordinates provided by the two or more users;
   determining an angle-orientation based navigation instruction based on the two or more recordings of direction-based navigation instructions by assigning an angle-orientation coordinate to the recording start waypoint, wherein the angle-orientation coordinate represents a direction coordinate by an angle, and based on the angle-orientation coordinate assigned to the recording start waypoint, determining angle-orientation coordinates corresponding to the direction coordinates of the two or more recordings of direction-based navigation instructions;
   storing the angle-orientation based navigation instruction having fixed instructions in a directed weighted graph;
   receiving a navigation assistance request for commuting between a user start waypoint and a user destination waypoint, the user start waypoint comprising a current location of a particular user;
   based on the received request, retrieving, from the directed weighted graph, an angle-orientation based navigation instruction between the user start waypoint and the user destination waypoint included in the navigation assistance request;
   converting, by a processor of a computer, a plurality of angle-orientation coordinates included in the retrieved angle-orientation based navigation instruction to a plurality of direction coordinates to obtain the direction-based navigation instruction;
   based on the conversion, determining the direction-based navigation instruction including the direction coordinates;
   forwarding, by the processor of the computer, the direction-based navigation instruction to a portable electronic device, the direction-based navigation instruction providing sensor-less navigation assistance for commuting between the user start waypoint and the user destination waypoint included in the navigation assistance request; and
   displaying, on a screen of the portable electronic device, the direction-based navigation instruction.

2. The computer implemented method according to claim 1, wherein determining the angle-orientation based navigation instruction includes:
    based on the assigned angle-orientation coordinate, computing, by the processor of the computer, the plurality of angle-orientation coordinates corresponding to the plurality of direction coordinates included in the direction-based navigation instruction recording.

3. The computer implemented method according to claim 1, further comprising:
    comparing the received direction-based navigation instruction with an existing direction-based navigation recording; and
    based on the comparison, merging the received direction-based navigation instruction with the existing direction-based navigation recording.

4. The computer implemented method according to claim 1, further comprising:
    receiving a navigation metadata for a path between the user start waypoint and the user destination waypoint;
    in the directed weighted graph, inserting a plurality of nodes corresponding to the user start waypoint and the user destination waypoint;
    inserting an edge between the plurality of nodes, the edge representing the path between the user start waypoint and the user destination waypoint; and
    assigning a clock-orientation based navigation instruction and the navigation metadata as weight of the inserted edge.

5. The computer implemented method according to claim 4, further comprising:
    based on the navigation metadata, identifying whether the path between the user start waypoint to the user destination waypoint is reversible;
    based on the identification, determining an angle-orientation based navigation instruction for a reverse path from the user destination waypoint to the user start waypoint;
    in the directed weighted graph, inserting an edge between the plurality of nodes, the edge representing the reverse path; and
    assigning the determined angle-orientation based navigation instruction as weight of the inserted edge.

6. The computer implemented method according to claim 4, further comprising:
    applying a routing algorithm on the directed weighted graph to determine a navigation route between the user start waypoint and the user destination waypoint; and
    based on the determined navigation route, retrieving the angle-orientation based navigation instruction from the directed weighted graph.

7. The computer implemented method according to claim 4, further comprising:
    identifying a plurality of edges starting from one of the plurality of nodes included in the directed weighted graph;
    comparing, by the processor of the computer, a plurality of angle-orientation based navigation instructions assigned to the plurality of edges;
    based on the comparison, determining a first non-similar angle-orientation coordinate in the plurality of angle-orientation based navigation instructions;
    based on the determination, identifying an intersection point between a plurality of paths corresponding to the plurality of angle-orientation based navigation instructions; and
    in the directed weighted graph, inserting a node corresponding to the identified intersection waypoint.

8. The computer implemented method according to claim 4, further comprising:
    using crowd-sourcing, receiving the two or more recordings of direction-based navigation instructions the navigation metadata; and
    assigning, by the processor of the computer, a user rating of a user as a rating of the received direction-based navigation recording.

9. A computer system for providing sensor-less navigation assistance, the computer system comprising:
    a processor to execute a program code; and
    a memory coupled to the processor, the memory storing the program code comprising:
        processing two or more recordings of direction-based navigation received from two or more users, the two or more recordings of direction-based navigation instructions being for commuting between a recording start waypoint and a recording destination waypoint, wherein the two or more recordings of direction-based navigation instructions include direction coordinates and distance coordinates provided by the two or more users;
        determine an angle-orientation based navigation instruction based on the direction-based navigation instructions by assigning an angle-orientation coordinate to the recording start waypoint, wherein the angle-orientation coordinate represents a direction coordinate by an angle, and based on the angle-orientation coordinate assigned to the recording start waypoint, determine angle-orientation coordinates corresponding to the direction coordinates of the two or more recordings of direction-based navigation instructions;
        store the angle-orientation based navigation instruction having fixed instructions in a directed weighted graph;
        receive a navigation assistance request for commuting between a user start waypoint and a user destination waypoint, the user start waypoint comprising a current location of a particular user;
        based on the received request, retrieve, from the directed weighted graph, an angle-orientation based navigation instruction between the user start waypoint and the user destination waypoint included in the navigation assistance request;
        convert a plurality of angle-orientation coordinates included in the retrieved angle-orientation based navigation instruction to a plurality of direction coordinates to obtain the direction-based navigation instruction;
        based on the conversion, determine the direction-based navigation instruction including the plurality of direction coordinates;
        forward the direction-based navigation instruction to a portable electronic device of the particular user, the direction-based navigation instruction providing sensor-less navigation assistance for commuting between the user start waypoint and the user destination waypoint included in the navigation assistance request; and
        wherein the portable electronic device includes a display screen on which to display the direction-based navigation instruction.

10. The computer system according to claim 9, further comprising:

based on the assigned angle-orientation coordinate, compute the plurality of angle-orientation coordinates corresponding to the plurality of direction coordinates included in the direction-based navigation instruction recording.

11. The computer system according to claim 9, further comprising:
receive a navigation metadata for a path between the user start waypoint and the user destination waypoint;
in the directed weighted graph, insert a plurality of nodes corresponding to the user start waypoint and the user destination waypoint;
insert an edge between the plurality of nodes, the edge representing the path between the user start waypoint and the user destination waypoint; and
assign the computed angle-orientation based navigation instruction and the navigation metadata as weight of the inserted edge.

12. The computer system according to claim 11, further comprising:
based on the navigation metadata, identify whether the path between the user start waypoint to the user destination waypoint is reversible;
based on the identification, determine an angle-orientation based navigation instruction for a reverse path from the user destination waypoint to the user start waypoint;
in the directed weighted graph, insert an edge between the plurality of nodes, the edge representing the reverse path; and
assign the determined angle-orientation based navigation instruction as weight of the inserted edge.

13. The computer system according to claim 11, further comprising:
apply a routing algorithm on the directed weighted graph to determine a navigation route between the user start waypoint and the user destination waypoint; and
based on the determined navigation route, retrieve the angle-orientation based navigation instructions from the directed weighted graph.

14. The computer system according to claim 11, further comprising:
identify a plurality of edges starting from one of the plurality of nodes included in the directed weighted graph;
compare a plurality of angle-orientation based navigation instructions assigned to the plurality of edges;
based on the comparison, determine a first non-similar angle-orientation coordinate in the plurality of angle-orientation based navigation instructions;
based on the determination, identify an intersection point between a plurality of paths corresponding to the plurality of angle-orientation based navigation instructions; and
in the directed weighted graph, insert a node corresponding to the identified intersection waypoint.

15. The computer system according to claim 11, further comprising:
using crowd-sourcing, receive the two or more recordings of the direction-based navigation instructions the navigation metadata; and
assign, a user rating of a user as a rating of the received direction-based navigation recording.

16. A non-transitory computer readable storage medium to tangibly store instructions, which when executed by a computer, cause the computer to:
receiving two or more recordings of direction-based navigation instructions from two or more users, the two or more recordings of direction-based navigation instructions being for commuting between a recording start waypoint and a recording destination waypoint, wherein the two or more recordings of direction-based navigation instructions include direction coordinates and distance coordinates provided by the two or more users;
determine a clock-orientation based navigation instruction based on the two or more recordings of direction-based navigation instructions by assigning a clock-orientation coordinate to the recording start waypoint, wherein the clock-orientation based navigation instruction represents a direction coordinate by a clock-orientation coordinate, and based on the clock-orientation coordinate assigned to the recording start waypoint, determine clock-orientation coordinates corresponding to the direction coordinates of the two or more recordings of direction-based navigation instructions;
store the clock-orientation based navigation instruction having fixed instructions in a directed weighted graph;
receive a navigation assistance request for commuting between a user start waypoint and a user destination waypoint, the user start waypoint comprising a current location of a particular user;
based on the received request, retrieve, from the directed weighted graph, a clock-orientation based navigation instruction between the user start waypoint and the user destination waypoint included in the navigation assistance request;
convert a plurality of clock-orientation coordinates included in the retrieved clock-orientation based navigation instruction to a plurality of direction coordinates to obtain the direction-based navigation instruction;
based on the conversion, determine the direction-based navigation instruction including the plurality of direction coordinates;
forward the direction-based navigation instruction to a portable electronic device, the direction-based navigation instruction providing sensor-less navigation assistance for commuting between the user start waypoint and the user destination waypoint included in the navigation assistance request; and
wherein the portable electronic device includes a display screen on which to display the direction-based navigation instruction.

17. The non-transitory computer readable medium according to claim 16, further comprising instructions which when executed by the computer further causes the computer to:
based on the assigned clock-orientation coordinate, compute the plurality of clock-orientation coordinates corresponding to the plurality of direction coordinates included in the direction-based navigation instruction.

18. The non-transitory computer readable medium according to claim 16, further comprising instructions which when executed by the computer further causes the computer to:
receive a navigation metadata for a path between the user start waypoint and the user destination waypoint;
in the directed weighted graph, insert a plurality of nodes corresponding to the user start waypoint and the user destination waypoint;
insert an edge between the plurality of nodes, the edge representing the path between the user start waypoint and the user destination waypoint; and assign the clock-orientation based navigation instruction and the navigation metadata as weight of the inserted edge.

19. The non-transitory computer readable medium according to claim 18, further comprising instructions which when executed by the computer further causes the computer to:

based on the navigation metadata, identify whether the path between the user start waypoint to the user destination waypoint is reversible;

based on the identification, determine a clock-orientation based navigation instruction for a reverse path from the user destination waypoint to the user start waypoint;

in the directed weighted graph, insert an edge between the plurality of nodes, the edge representing the reverse path; and assign the determined clock-orientation based navigation instruction as weight of the inserted edge.

20. The non-transitory computer readable medium according to claim 18, further comprising instructions which when executed by the computer further causes the computer to:

apply a routing algorithm on the directed weighted graph to determine a navigation route between the user start waypoint and the user destination waypoint; and based on the determined navigation route, retrieving the clock-orientation based navigation instruction from the directed weighted graph.

* * * * *